United States Patent [19]
Paulsen et al.

[11] Patent Number: 5,346,177
[45] Date of Patent: Sep. 13, 1994

[54] HIGH PRESSURE GAS LINE BREAKAWAY CONNECTOR

[75] Inventors: R. P. Grant Paulsen, West Hill; Ralph Rackham, Toronto; Peter J. Thuerig, Brampton, all of Canada

[73] Assignee: Fuel Maker Corporation, Toronto, Canada

[21] Appl. No.: 713,362

[22] Filed: Jun. 13, 1991

[51] Int. Cl.$^5$ ............................................. F16L 37/28
[52] U.S. Cl. .................... 251/149.6; 285/306
[58] Field of Search ................ 251/149.6; 285/1, 306, 285/920

[56] References Cited

U.S. PATENT DOCUMENTS

| | | | |
|---|---|---|---|
| 2,861,281 | 11/1958 | Harter | 285/306 |
| 3,058,717 | 10/1962 | Wiltse | 251/149.6 |
| 3,336,053 | 8/1967 | Carse | 285/1 |
| 4,328,948 | 5/1982 | Pearl, II | 251/149.6 |
| 4,506,863 | 3/1985 | Quin et al. | 285/920 X |

Primary Examiner—Martin P. Schwadron
Assistant Examiner—Kevin L. Lee

[57] ABSTRACT

An automatic tension-activated in-line connector for a pressurized hose is provided with pressure compensation means by which the necessary tension to effect decoupling is rendered less responsive to resistance created by high line pressures.

2 Claims, 5 Drawing Sheets

HIGH PRESSURE GAS LINE BREAKAWAY CONNECTOR

FIELD OF THE INVENTION

This invention relates to couplings for high pressure hose lines. In particular it relates to a hose coupling that will automatically disconnect when a predetermined level of tension is applied to the connector by pulling on the hose line. More particularly, the invention can be adapted to a coupling with an automatic shut-off feature, as where the line or hose being coupled carries a fluid, such as gas, hydraulic oil or steam under pressure and is provided with a check-valve to close off the line upon disconnection.

BACKGROUND OF THE INVENTION

In the handling of high pressure fluids it is known to provide hose connectors that include an internal shut-off or check valve. The check valve closes automatically on decoupling of the connector in order to prevent the leakage of gas or liquid from the disconnected coupling. Auto-shut off connectors are useful as well on high pressure air lines to prevent such lines from thrashing when disconnected.

Examples of patents that have issued for this class of connector include U.S. Pat. No. 4,865,077 to Batchen, and U.S. Pat. No. 4,827,977 to Fink and Husky. Various commercial models previously in use include the HANSEN Coupling made by the Hansen Coupling Division of Tuthill Corporation of Cleveland, Ohio, TOMCO connectors by Tomco Division of C.S.P. Inc. of Willowick, Ohio, and HOFMANN connectors by Holmann Engineering Co. Inc. of Burr Ridge, Ill.

In the Hansen design, which is typical, a male portion of the connector, called hereafter the "plug", is held in place within a female portion of the connector, called the "female coupling", by radially located steel balls. These balls are contained in a race around the inner circumference of the female coupling. The steel balls partially inter-fit into a complementary groove formed on the outer circumference of the plug, once the connector portions are assembled. The steel balls are radially displaceable within their race, but are held in an advanced, groove-engaging, locking position by an outer locking/release ring.

This outer ring is displaceable longitudinally, and carries an inner groove into which the steel balls may be displaced, once this groove is aligned with such balls. Adjacent the groove, an inner locking surface on the ring holds the balls in their advanced, locking position within the race when advanced to overlie the balls.

The locking/release ring is biased by a spring to advance along the connector until the locking surface overlies the steel balls. By overcoming this bias, i.e. by displacing the locking/release ring, the groove may be aligned with the steel balls to effect engagement and disengagement of the coupler portions.

The Hansen coupling requires manipulation to effect engagement of the coupling. That is, the locking/release ring must be displaced manually to allow the steel balls to recede within their race while coupling is effected. Other connectors provide for automatic engagement upon insertion of the plug into the female coupling.

In the field, connectors of the Hansen type have been rendered into auto-disengaging couplings that disconnect under tension developed by pulling on the line leading to the connector. This has been effected by anchoring the release ring to a stationary object by a linkage, such as a chain. Tension on the line causes the connector to move with respect to the release ring. Upon sufficient displacement of the connector with respect to the release ring, release is effected.

In the Hansen connector, the steel balls, which serve as a latch means, are continually subject to a pressure, arising from the tendency of the connector portions to separate. This pressure, if it were not for the presence of the locking/release ring in its appropriate position, would displace the steel balls and effect release of the coupling.

The Mansen-type coupling is relatively insensitive to line pressure as the thrust on the steel balls is partially absorbed by the race, and the frictional resistance between the locking/release ring and the steel balls is correspondingly reduced. Nevertheless, some resistance exists, and this residual resistance is proportional to line pressure.

Another type of connector in this field is that manufactured by S.A. Des Etablissements Staubli of France. This device, depicted in European Patent Application 82420113.1 and published as EP-0-077-743-A1, shows a connector wherein a transverse activating pin provides a double latching action for release of the connector. The focus of this patent is on the double latching action.

In both the Hansen and Staubli type connectors a single internal check valve, biased to close by a spring, may be provided. This check valve can be contained within a female portion of the connector, but could alternately or also be located in the male or plug portion. In all cases a probe carried on the opposing portion of the connector, when assembled, holds the check valve open.

The Staubli connector differs from the Hansen connector in that engagement of the connector does not require any manipulation of a locking ring or the like. Instead, engagement is effected by the mere application of insertion pressure on the plug into the female coupling whereby a bayonet-like engagement is effected. The barb-equivalent on the plug portion of the Staubli connector is a ring with a bevelled forward edge and a perpendicular rearward side. This rearward side engages with and is held in place by a first latching portion of the transverse activating pin, once the connector is assembled.

The double latching effect arising on uncoupling in the Staubli connector is achieved by a second latch portion on the activating pin that stops the withdrawal of the male plug portion of the connector after partial disconnection occurs. This interruption of the disengagement process allows the check valve to close and the line carrying the plug, which lacks its own check valve, to depressurize without thrashing. Release of the second latch allows full withdrawal to be effected.

The Staubli connector is manually operated. However, its feature of reliance on a transverse activating pin to effect decoupling can be adapted to provide a tension-activated auto-disengaging connector. Such a tension-activated connector is useful particularly where compressed gas is being pumped into a vehicle holding tank, as where cars are fueled by compressed natural gas. On occasion an operator may decide to move the vehicle, forgetting to manually disconnect the coupling on the fluid feed line. By providing a tension-activated coupler the risks of having a ruptured fluid line are eliminated.

The activating pin in the Staubli connector differs from the locking/release ring in the Hansen type connector in that the Staubli connector requires that pressure be applied to the activating pin or actuator so that unlatching of the connector may be effected. Because the barbed ring on the plug is held by a latch that is displaced transversely, there is no tendency for line pressure to disengage the latch. A positive displacement of the actuator by application of actuating pressure is necessary in order to cause the latch to disengage.

In a separate application by Gordon Bryce, a tension-activated auto-disengaging coupler that contains an actuator for the latch is disclosed. The actuator therein; is biased by a spring to resist actuation but contains a means that will automatically effect disengagement when a pro-determined tension is applied to the coupling. This coupler is based on a transversely moving latch similar in some respects to the Staubli connector.

In the Staubli connector, the frictional resistance to displacement of the first latch proportional to line pressure. Such friction arises at the point of contact between the first latch and the rear side of the barbed ring on the male plug. This friction increases the effort required to displace the transverse activating pin. Such resistance is particularly sensitive to line pressure because the first latch in the Staubli connector is displaced transversely to the direction in which the connector portions connect and disconnect.

Accordingly, it is an object of this invention is to reduce the effort required to unlatch an auto-disconnecting connector under conditions of high line pressure.

The invention in its general form will first be described, and then its implementation in terms of specific embodiments will be detailed with reference to the drawings following hereafter. These embodiments are intended to demonstrate the principle of the invention, and the manner of its implementation. The invention will then be further described, and defined, in each of the individual claims which conclude this Specification.

SUMMARY OF THE INVENTION

According to the invention a prior art tension-activated auto-disengaging fluid line connection device comprises:

(1) a connector with complementary, interfitting but disengageable male and female portions, one of such portions being provided with line coupling means for connection to a hose containing a source of high pressure fluid and thereby constituting the pressurized portion of the connector, the other portion of the connector constituting the non-pressurized portion of the connector;

(2) a spring-activated check valve contained within the pressurized portion of the connector, biased by a check valve spring mounted within the said pressurized portion to displace the check valve towards closure;

(3) a probe forming the non-pressurized portion of the connector for opening the check valve upon assembly of the connector;

(4) A latch means for releasably holding the male and female connector potations together, once assembled, (5) an actuator, connected to said latch means so as to effect release of the latch means by the application of pressure to the actuator, such actuator being accessible from outside of the connector;

(6) a housing, provided with a means for such housing to be anchored externally to a stationary body, such housing extending over the actuator and positioned to contact and apply pressure to activate such actuator upon displacement of the housing with respect to the connector; and (7) a principal spring means biasing the housing to separate from the actuator;

wherein the housing and actuator are positioned so that upon application of tension to one portion of the connector, the housing will advance towards the actuator, and at a predetermined level of tension, will activate such actuator by applying pressure thereto and thereby and effect release of the latch means and disengagement of the male and female portions of the connector. In such a connector the frictional resistance in the latch that is developed when the fluid line is highly pressurized may be partially relieved by reducing the effective force of the spring which biases the housing and actuator to separate. According to the invention; this is achieved by providing the connector with a sealed but sliding attachment to the high pressure source. Such sliding attachment, being located on the side of the connector remote from the principal spring means, allows the line pressure to bias the connector to advance within the housing, compressing the spring and partially counteracting the force generated by the principal spring means which otherwise biases the housing and actuator to separate.

The foregoing arrangement is effective when the high pressure source originates from an appliance, such as a gas pump or fixed manifold for supplying stored gas. In such cases, the housing is fastened to the appliance.

The pressure compensating feature may be incorporated into an inline connector by providing the fluid source from a hose which terminates in an adaptor. The adaptor is coupled to the housing and provides a bore within which the nipple may sealingly slide. The invention, is particularly applicable in cases where the actuator is mounted transversely in the connector and is provided with a conically bevelled outer end that contacts with an inner camming surface on the housing, preferably in the form of an annular rim, in order to activate such actuator.

The foregoing summarizes the principal features of the invention. The invention may be further understood by the description of the preferred embodiments, in conjunction with the drawings, which now follow.

DESCRIPTION OF PREFERRED EMBODIMENTS

Figure 1:
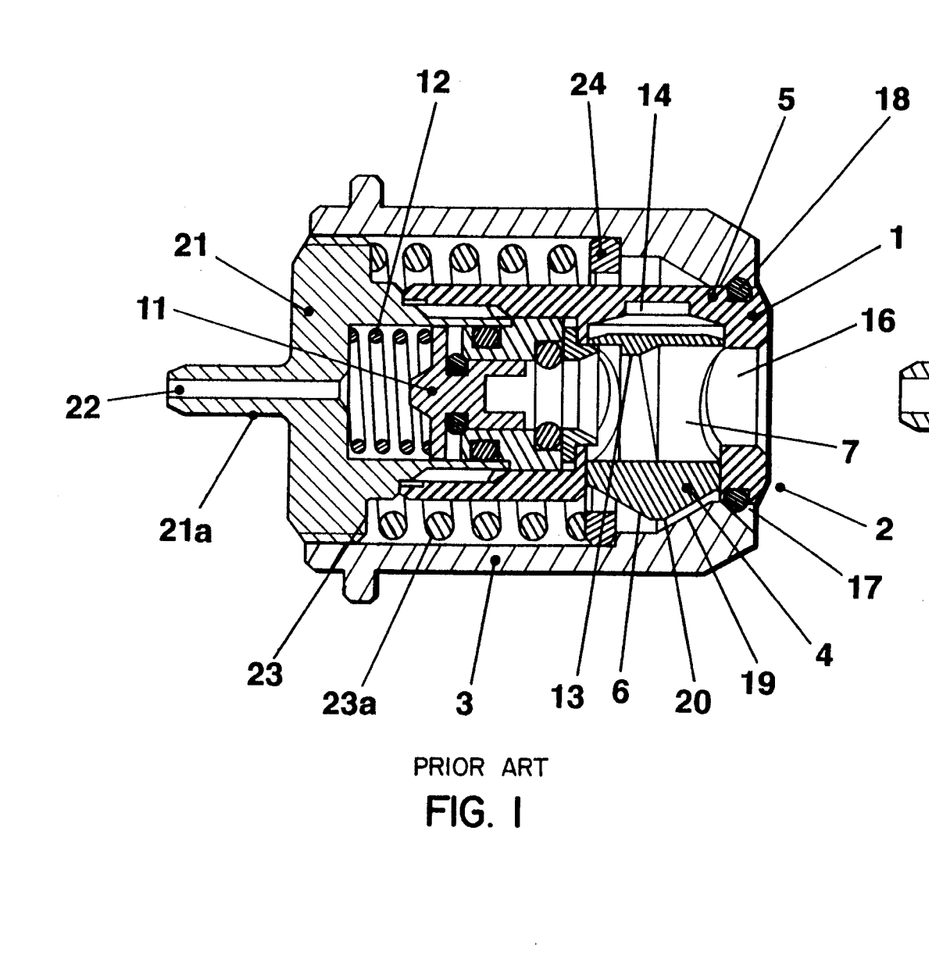
FIG. 1 is a cross-section of a prior art female coupler.

In FIG. 1 a prior art connector is depicted wherein a female coupling 1 forming part of a connector 2 is assembled within a housing 3. The female coupling 1 has a transversely mounted latch actuator 4 mounted in a transverse bore in the body 5 of the female coupling 1. The actuator 4 is provided with a bevelled external end 6 and a transverse passage 7 to receive a male plug 8 and hose 8a, shown separately in FIG. 2.

Figure 2:
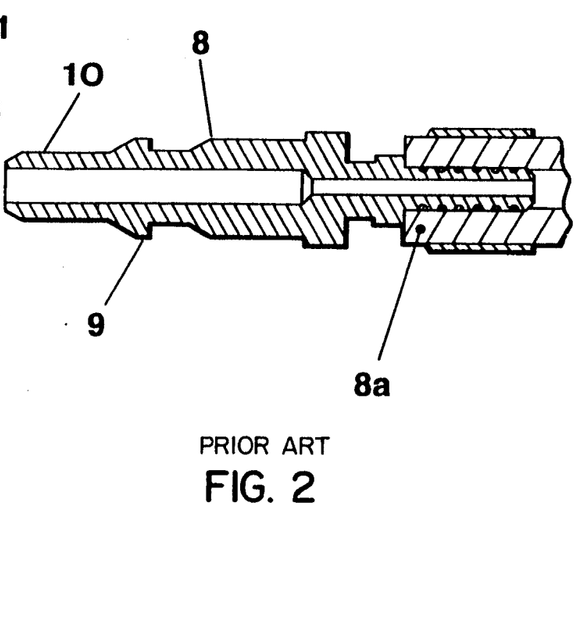
FIG. 2 is a side view of a prior art male plug with hose attached aligned with the coupler of FIG. 1.

The plug 8 carries a barbed engagement ring 9 and a probe 10. The probe 10 presses open the check valve 11 contained in the female coupling 1 overcoming the resistance of the check valve spring 12.

The barbed ring 9 on the plug, when assembled, is locked in place by the latch 13 which is a protruding surface carried on the actuator 4. The actuator 4 is biased by an actuator spring 14 to hold the latch 13 in engagement with the ring 9. Although the actuator 4 is shown as integrally carrying the latch 13, these components may be joined by linkages, allowing the actuator end to protrude in the longitudinal direction from the end of the body 5.

By the application of pressure to the actuator's bevelled end 6, the resistance of the actuator spring 14 may be overcome, and the latch 13 displaced to release the plug 8.

The female coupling 1 is contained within a housing 3 with the access opening 16 for the plug 8 to enter the female coupling 1 accessible through a housing-access opening 17. The female coupling partially free to slide within the housing access opening 17, such travel being limited by retention-ring 18 and contact between the bevelled end 6 and a circular pressure rim 19 formed on the inside of the housing access opening 17. Displacement of the female coupling 1 towards the rim 19 will create a pressure on the actuator 4 by reason of the angle of the surface 20 formed on the bevelled end 6 of the actuator 4.

Figure 4:
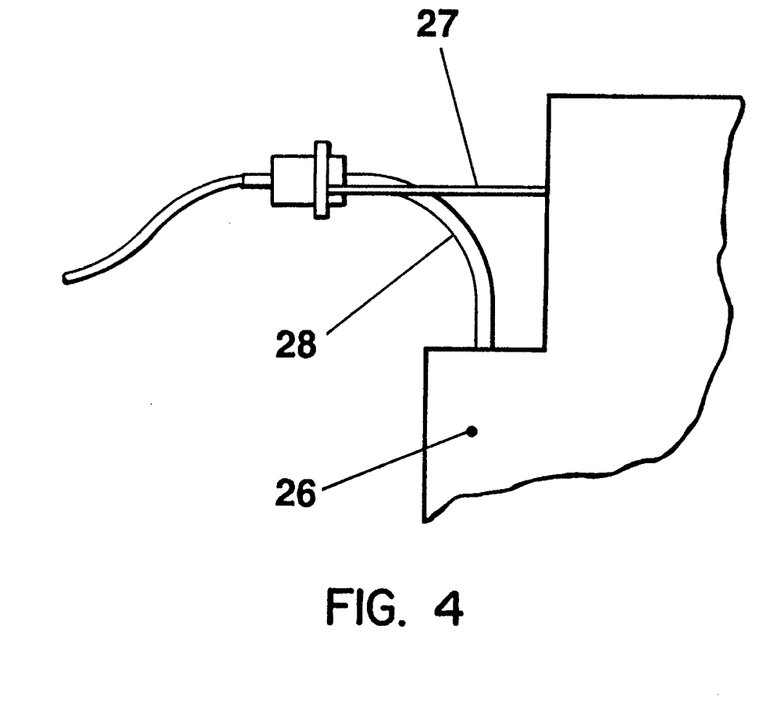
FIG. 4 shows a prior art arrangement of a housing anchored by a chain to a stationary object.

The female coupling 1 terminates at the end opposite the access opening 16 with a nippled adaptor 21 that has a protruding nipple 21a and a first central passage 22 for conducting fluid to a hose 28 (shown in FIG. 4). In this prior art connector, the nipple 21a connects directly to a hose and the adaptor 21 is retained from removal from the housing 3 by a connection to the retention ring 18 through the body 5 of the female coupling 1.

The adaptor 21 has an annular shoulder 23 against which thrusts a principal housing spring 23a. This spring 23a, in turn, thrusts at its opposite end against the housing 3 optionally through a washer 24. The tendency of this principal spring 23a is to move the female coupling 1 and the bevelled end 6 of the actuator 4 away from the pressure rim 19 on the housing 3.

According to the manner of use of this prior art connector the housing 3 is anchored to a stationary object 26, such as a manifold or frame, as by a chain or wire harness 27 as shown in FIG. 4. If the hose 28 is sufficiently sturdy it may also serve to attach the connector housing 3 to a stationary object, so long as sufficient slack is provided to permit the connector to move within the housing.

When tension is applied to the plug 8, as by pulling on a hose 8a attached to the plug 8, this tension is transmitted through the female coupling 1 to compress the principal spring 23a. Compression of this spring 23a causes the bevelled end 6 of the actuator 4 to press against the pressure rim 19 on the housing 3. This displaces the activator 4, unlatching the plug 8 by moving latch 13 out of engagement with the barbed ring 9 on the plug 8. This thereby constitutes automatic uncoupling of the connector.

In the presence of high pressure with the lines being coupled, vis 3000 psi in the case of natural gas, the friction between the latch 13 and ring 9 is such that the required tension needed to effect disconnection of the plug approach levels that risk rupture of the hose 8a.

To alleviate the tensile force necessary to actuate decoupling, the present invention provides a means by which the line pressure can be used to partially load and depress the principal spring 23a in the following manner.

Figure 3:
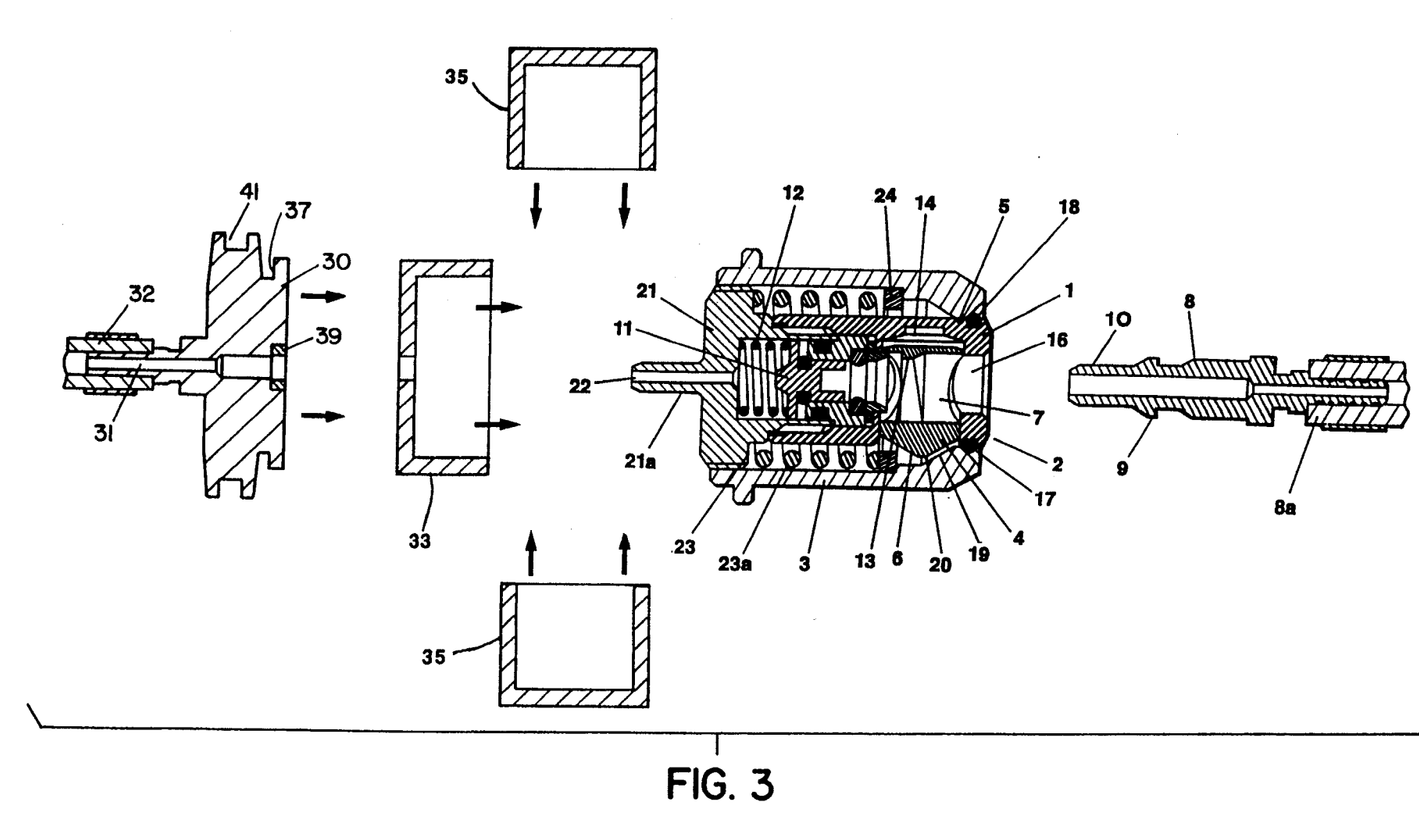
FIG. 3 is an exploded view of the plug and coupler of FIGS. 1 and 2, aligned with a novel pressure plate assembly and hose prior to assembly.

The nipple 21a engages with a pressure plate 30, as shown in FIG. 3, with a second central passage 31 into which it fits with a sealed but sliding fit. The seal may be enhanced by an "o" ring 39 carried in the pressure plate 30. The pressure plate 30, on its other side, is connected to a hose 32 in the normal manner.

Figure 6:
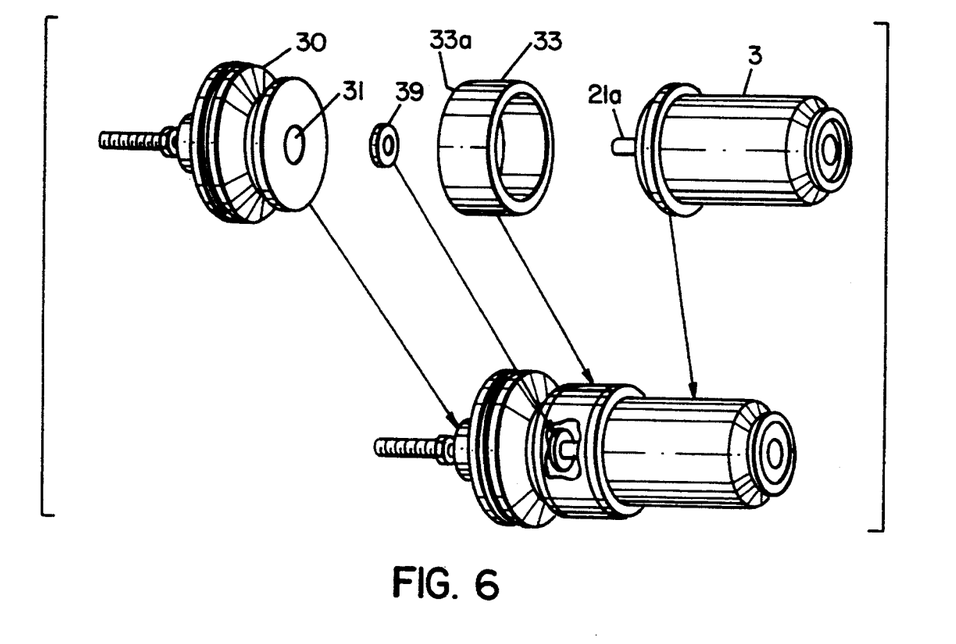
FIG. 6 shows an exploded view of the interior parts of a pressure compensated connector.
Figure 7:
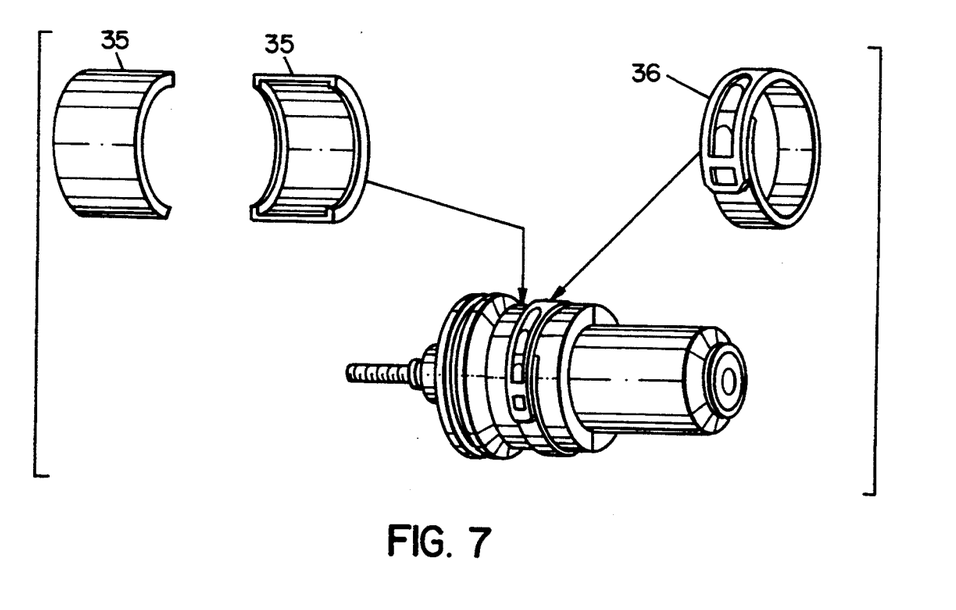
FIG. 7 shows the exterior parts of a pressure compensated connector.

As shown in FIG. 6 the pressure plate 30 is connected to the housing 3 by a spacer ring 33 that provides freedom of travel for the nipple 21a within the second central passage 31 and supports a retention plate 33a at its base end to hold the nipple "o" ring 39 in place. The pressure plate 30, spacer ring 33 and housing 3 are fastened together as an assembly by a split clamping ring 35 that hooks onto engagement surfaces 37, 38 on the pressure plate and housing 3 respectively (as shown in FIG. 3). For extra safety, a security strap 36, as shown in FIG. 7, holds the clamping ring 35 together.

Figure 5:
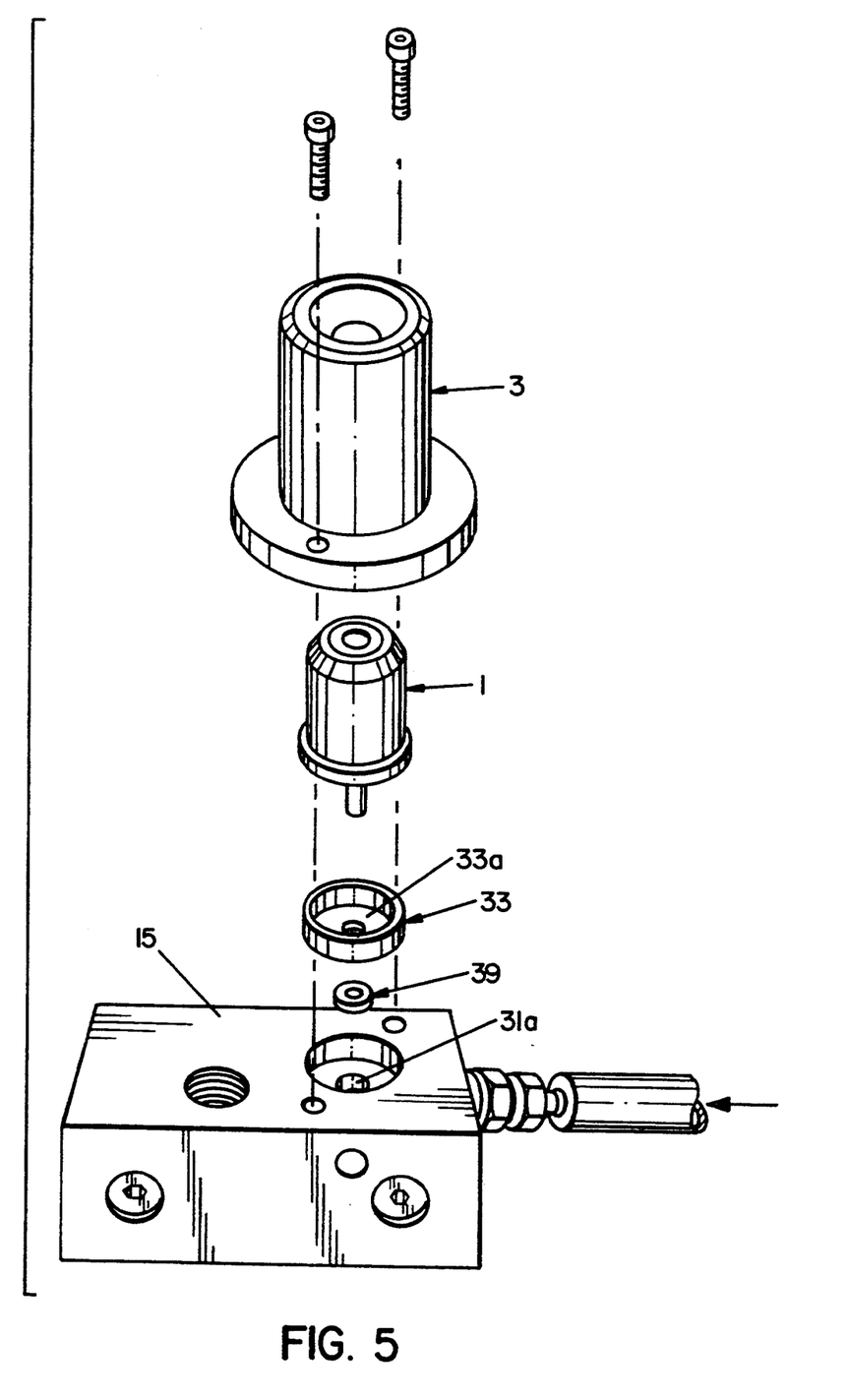
FIG. 5 shows a housing anchored by being bolted to a stationary support.

Optionally, the assembly may be enveloped in a rubber boot (not shown). An outer groove 41 in the pressure plate may receive an "o" ring (not shown) to engage this boot. Further, the housing 3 may be bolted to a stationary frame manifold block 15, as shown in FIG. 5. In such case the second central passage 31a is formed within the frame manifold 15 itself.

While the housing 3 and the pressure plate 30 are fastened together as a rigid assembly, the adaptor 21 is free to move within the housing 3. As fluid pressure within the central passage 31 of the pressure plate 30 increases, it exerts an increasing force on the end of nipple 21a. This force acts to load the principal spring 23a, tending to compress it and thereby assisting in decoupling the connector.

"Thus the line pressure which is presented to the nipple 21a through the pressure plate 30 biases the nipple 21a (and the adaptor 5 to which it is attached) to press against the force of the spring 23a, with the effect of tending to depress the actuator 4 inwardly. The frictional resistance of the latch 13 to displacement is proportional to line pressure. The action of the line pressure on the nipple 21a in partially loading the principal spring 23a, allows the connector to disengage more easily under a lesser applied tensile force."

The result is an auto-disengaging high pressure connector which, by providing for the sealed but sliding connection of the connector to a gas line, the necessary tension to effect decoupting is rendered less responsive to resistance created by high line pressures.

Conclusion

The foregoing has constituted a description of specific embodiments showing how the invention may be applied and put into use. These embodiments are only exemplary. The invention in its broadest, and more specific aspects, is further described and defined in the claims which now follow.

We claim:

1. In a tension-activated auto-disengaging fluid line connection device that comprises:
   (1) a connector with complementary, interfitting but disengageable male and female portions, one of such portions being provided with coupling means in the form of a nipple for receiving fluid from a high pressure source and thereby constituting the pressurized portion of the connector, the other portion of the connector constituting the non-pressurized portion of the connector;
   (2) a spring-activated check valve contained within the pressurized portion of the connector, biased by a check valve spring mounted within the said pressurized portion to displace the check valve towards closure;
   (3) a probe, formed upon the non-pressurized portion of the connector for opening the check valve upon assembly of the connector;
   (4) latch means carried by said connector for releasably holding the male and female connector portions together, once assembled,
   (5) an actuator, connected to said latch means so as to effect release of the latch means by the application of pressure to the actuator, such actuator being accessible from outside of the connector;
   (6) a housing, extending over the actuator and positioned to contact and apply pressure to activate such actuator upon displacement of the housing with respect to the connector;
   (7) a principal spring means applying a force for biasing the housing to separate from the actuator;
   wherein the housing and actuator are positioned so that upon application of tension to the connector, the housing will advance towards the actuator, and at a predetermined level of tension, will activate such actuator by applying pressure thereto and thereby effect release of the latch means and disengagement of the male and female portions of the connector, the improvement comprising an adaptor having:
   (1) a pressure plate provided with connection means on one side for connection to a high pressure fluid source, and on the other side with a passage to receive the nipple with a sealed but sliding fit; and
   (2) means to connect the pressure plate and housing together;
   to thereby allow line pressure to bias the actuator to advance against the force of the principal spring and reduce the predetermined level of tension that will effect release of the latch means.

2. A connection device as in claim 1 wherein the actuator is mounted transversely in the connector and is provided with a conically bevelled outer end and wherein the housing is provided with an inner camming surface positioned to activate such actuator by contact with the bevelled outer end on displacement of the connector towards the camming surface.

* * * * *

UNITED STATES PATENT AND TRADEMARK OFFICE
CERTIFICATE OF CORRECTION

PATENT NO. : 5,346,177
DATED : September 13, 1994
INVENTOR(S) : R.P. Grant Paulsen, Ralph Rackman and Peter J. Thuerig It is certified that error appears in the above-identified patent and that said Letters Patent is hereby corrected as shown below:

Title page,
Item [73], Assignee, should read -- FUELMAKER CORPORATION --

Signed and Sealed this

Twenty-eighth Day of December, 2004

JON W. DUDAS
*Director of the United States Patent and Trademark Office*